April 8, 1924.

A. G. SHIDEED 1,490,037

DRIVING CHAIN

Filed April 30, 1920

Inventor
Abraham G. Shideed
by Gardner W. Pearson
Attorney

Patented Apr. 8, 1924.

1,490,037

UNITED STATES PATENT OFFICE.

ABRAHAM G. SHIDEED, OF LAWRENCE, MASSACHUSETTS.

DRIVING CHAIN.

Application filed April 30, 1920. Serial No. 377,979.

*To all whom it may concern:*

Be it known that I, ABRAHAM G. SHIDEED, a citizen of Syria, residing at Lawrence, in the county of Essex and State of Massachusetts, have invented certain new and useful Improvements in Driving Chains, of which the following is a specification.

This invention relates to driving chains.

It is especially useful in connection with cone pulleys used in certain types of textile machinery. It may also be used with any pulley on any machine, especially to replace a leather belt in concealed places where a belt may stretch and slip without being noticed, as in driving the radiator fan of an automobile, or where such a belt is subjected to oil or other material which will cause it to deteriorate.

The purposes of my invention are to provide an endless chain which will have an elastic grip on the pulley or pulleys over which it runs, but which cannot stretch beyond a certain point, whereby it will grip the pulley to better advantage with the result that a more perfect tension will be obtained by eliminating the slip on the pulleys, thereby increasing the power factor. My chain is elastic and need not be tightened to get a grip. It therefore causes less uneven wear on bearings and, having better traction with less tightening, it saves power.

My driving chain is particularly useful on cone or flat faced pulleys to take the place of a flat belt.

In the drawings, Fig. 1 is an elevation of a cone pulley with one of my chains in place.

Figure 2:
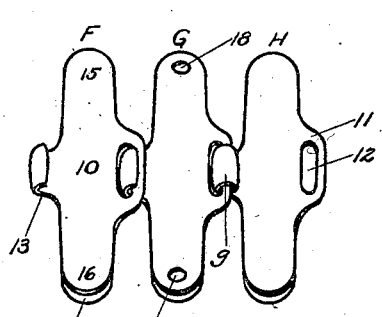
Fig. 2 is a plan view of three links of my preferred construction fastened together.

In the drawings, A represents a cone pulley carried by a shaft, such as B, and C represents a chain of my construction formed of links F, G and H, as shown in Fig. 2.

Figure 3:
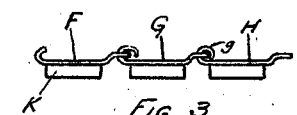
Fig. 3 is an elevation from the side, or as looking from the bottom of Fig. 2.
Figure 4:
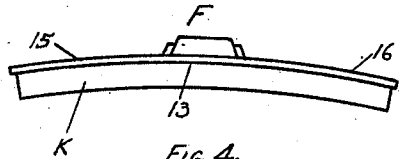
Fig. 4 is an elevation as from the left of Fig. 2.

In the construction shown in Figs. 2, 3 and 4, each link, such as F, G and H, is made as by being stamped from sheet spring metal, and is shown as having a body 10 from the back of which extends an ear 11 in which is a passage or slot 12 through which the hook 13 from the front of another link can pass. Preferably, this hook, as shown on link F, is open, or almost closed as in G, as see Fig. 7, but it may be closed in, as shown at 9, if preferred. The elasticity of the whole chain makes it unlikely that the links will become loose or separate.

On each side of body 10 are the bow-shaped wings 15 and 16, laterally disposed to the length of the chain and having a substantial amount of elasticity.

As shown in Fig. 4, the concave side of the wings and the body are preferably faced with padding material K, which may be leather, rubber, or other suitable material. This may be cemented in place or, as shown in the link G, Fig. 2, may be attached by rivets, such as 18. This prevents scratching the pulley and aids in traction.

Figure 5:
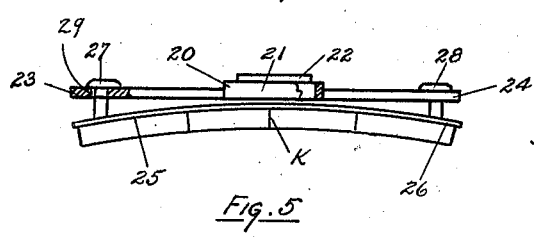
Fig. 5 is a view similar to Fig. 4 of a modified construction.

In Fig. 5, I show a body 20 with an ear 21 at the back with a suitable slot, and a hook 22 at the front adapted to pass through a similar slot. This body 20 has cross arms 23 and 24 and bow-shaped wings 25 and 26 made of spring material connected to cross arms 23 and 24 by headed pins 27 and 28 which pass through suitable slots or passages 29 whereby the wings are held in position but give, allowing pins 27 and 28 to be forced back.

These wings are shown as covered on their concave side with padding material K in several sections.

Figure 6:
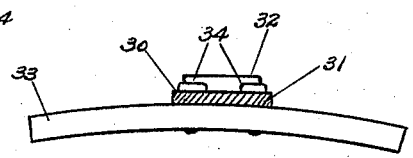
Fig. 6 is a view similar to Fig. 4 of another modified construction with the passage ear cut off.

In Fig. 6, the construction of each link is shown as comprising a body 30 of relatively rigid material having a suitable ear 31 in which is a hook passage, not shown, and a suitable hook 32.

To this body 30, on the side next to the pulley, I may attach a bow-shaped wing, such as 33, which may be of rubber, wood, or other resilient material, which needs no facing of any kind. This may be attached to the body by means of rivets 34, or of course it might be cemented.

Figure 7:
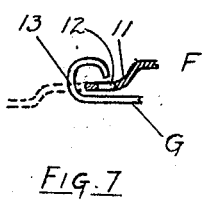
Fig. 7 is an elevation partly in section of a modification of the hook and passage.

The hook 13, as shown in Fig. 7, may be nearly closed, but open enough to allow the passage ear of the adjoining link to be slipped under, as shown in the full lines, and then turned over into place, as shown in the dotted lines.

The wings 15, 16, 25, 26 and 33 form laterally disposed bow-shaped elastic members.

It is clear that when the chain is tightened around a pulley, these bow-shaped members flatten out thereby allowing the chain to hug the pulley more closely, although the chain itself does not lengthen. These bow-shaped members have an effect similar to that of a chain or belt faced with an elastic material like rubber in causing the chain to cling to the pulley.

Figure 1:
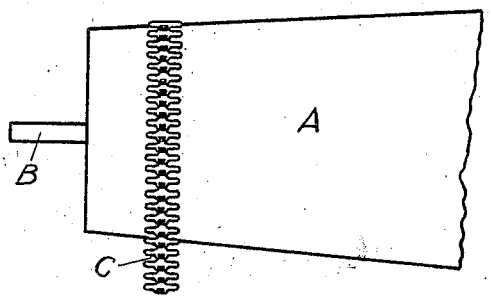

On a cone pulley such as shown in Fig. 1, the tip of one wing may be flattened out more than the other, although the manner of connecting the links by hooks permits a lateral tipping which allows the tips to be flattened uniformly.

I claim:

1. The combination in a driving chain of a plurality of links, each link made of sheet spring metal having at one end a hook and at the other end a passage suitable to receive an adjoining hook, each link having a laterally extending bow-shaped elastic member faced on its concave side with padding material.

2. The combination in a driving chain of a plurality of links connected together, each link having a laterally disposed bow-shaped elastic member faced on its concave side with padding material.

3. The combination in a driving chain of a plurality of links connected together, each link having a laterally disposed bow-shaped elastic member.

In testimony whereof I have affixed my signature.

ABRAHAM G. SHIDEED.